Jan. 29, 1952     W. A. KINGSBURY     2,583,577
CORING TOOL
Filed May 24, 1947
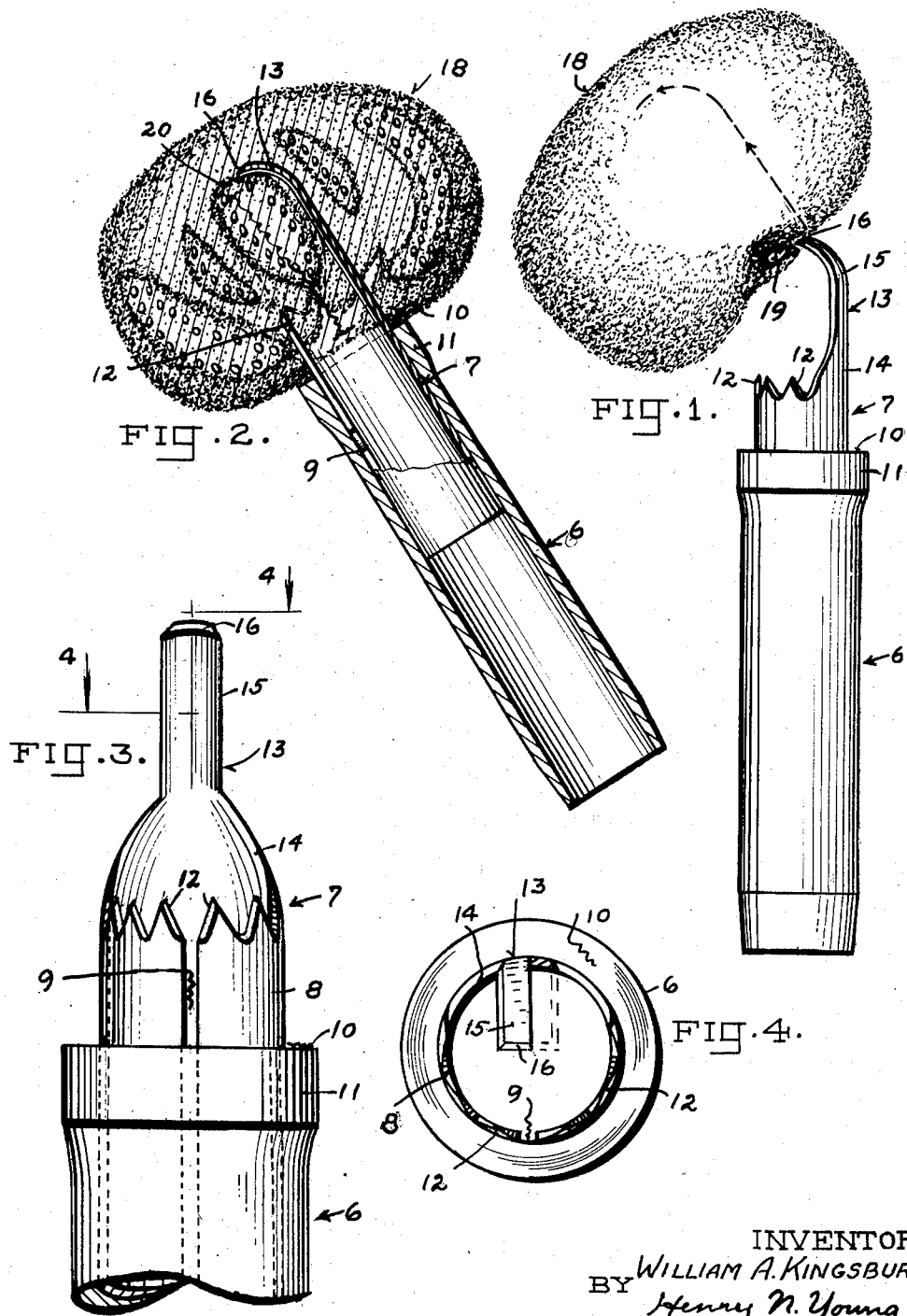
INVENTOR.
WILLIAM A. KINGSBURY
BY Henry N. Young
ATTORNEY.

Patented Jan. 29, 1952

2,583,577

UNITED STATES PATENT OFFICE 2,583,577

CORING TOOL

William A. Kingsbury, Oakland, Calif.

Application May 24, 1947, Serial No. 750,285

4 Claims. (Cl. 30—279)

The invention relates to a hand-held coring tool for use in coring vegetables such as tomatoes and pitless fruits such as pears and apples.

An object of the invention is to provide a coring tool of the class described which is particularly simple and effective.

Another object is to provide a coring tool which is applicable to an adjustably predetermined depth.

A further object is to provide a hand operated coring tool which effects a minimum mutilation of the flesh of a vegetable or fruit which is cored by it.

The invention possesses other objects and features of advantage, some of which, with the foregoing, will be set forth or be apparent in the following description of a preferred embodiment thereof, and in the accompanying drawings in which, Figure 1 shows the present coring tool as positioned for entry into a tomato for effecting a coring thereof.

Figure 2 is a sectional view showing the corer as fully entered before coring has been effected.

Figure 3 is an enlarged fragmentary side view of the working end of the present corer.

Figure 4 is a partly sectional view at the broken line 4—4 in Figure 3.

The structure of the present coring tool essentially comprises a tubular handle element 6 providing a uniform bore which telescopically and frictionally receives the base end portion 8 of a tubular coring member 7 which provides the cutting portions of the tool. As particularly shown, the portion 8 of the member 7 is provided with a longitudinal slit 9 which permits a circumferential compression of the portion for its insertion and frictional engagement in the handle element 6, the circumference of the section 8 being greater than that of the handle bore when the member 7 is removed from the handle; in this manner, the member 7 is arranged to be frictionally held in adjusted position within the handle bore when the tool is assembled for use. For use in a manner which will hereinafter appear, the forward end of the handle 6 is formed to provide a relatively wide flat annular end face 10; in the present handle, the forward end part 11 of the relatively thin-walled tube providing the handle is thickened or flanged to provide the face 10.

The forward end of the portion 8 of the member 7 is serrated for substantially half of its circumference, a cutting blade 13 extending axially for the remainder of the circumference. The teeth 12 thus provided are relatively coarse and are so sharpened that they provide a continuous cutting edge at the bore of the member, it being noted that the slot 9 terminates forwardly between the bases of adjacent teeth 12 midway in the line of teeth. The present blade 13 extends integrally and axially from the portion 8 of the member 7 beyond the line of teeth 12, said blade having a base portion 14 of generally triangular form, and a relatively narrow outer knife portion 15 having mutually parallel side edges and being cut off square at its extremity.

The blade 13 is diametrically opposite the slot 9 of the member 7, and has its sides and ends sharpened in a bevelled manner to provide a continuous cutting edge bounding its inner face whereby the blade may have an action similar to that of the teeth 12 when it is rotated about the tool axis while it is appropriately engaged and positioned in an article to be cored, the blade thus comprising the operative equivalent of a tooth 12 during a coring operation. The forward end part of the blade 13 is arcuately curved inwardly to dispose its point 16 at, or substantially at, the axial line of the tool, the arc of this part preferably being about 75 degrees. The part of the blade 13 inwardly of its turned-in part preferably comprises a straight continuation of the wall of the tubular coring element 7 whereby no portion of the blade extends beyond the continued cylinder of the exterior of the element.

Having the blade point 16 applied to a tomato 18, or the like, near its stem point 19 as shown in Figure 1, the tomato is impaled upon the blade 13 by moving it upon the blade and/or inserting the blade axially in it with the blade point 16 following such a path beside the core 20 to be removed as to finally dispose the point 16 at or close to the axis of the tomato as the end face 10 of the handle 6 engages the outside of the tomato. The face 10 of the handle is thus understood to function as a stop for limiting the distance of insertion of the coring member 7 within the tomato, it being noted that the serrated cutting edge provided by the teeth 12 axially enters the tomato before the blade point 16 reaches its final position; the path of the blade point with respect to the tomato 18 is indicated in dash lines in Figure 1, and the final operative disposition of the blade is shown in Figure 2. Since vegetables and fruits to be cored may be of different sizes and are usually size-graded before coring, the setting of the point 16 in appropriate spaced relation to the stop face 10 of the handle will be effected before a given lot of articles is cored by use of the tool.

Having a tomato and coring tool mutually engaged as in Figure 2, the tomato and tool are relatively rotated through one complete revolution about their more-or-less aligned axes to free the core behind the point 16 and in the outer end of the bore of the portion 8 of the member 7, said bore being uniform whereby the axial separation of the tomato and tool will remove the freed core from the tomato, the core being generally retained in the outer end portion of the member 7. The bore of the member 7 is uniform behind the teeth 12 whereby the released core 20 may move radially therethrough and thence through the bore of the handle 6 to escape from the tool. If a freed core 20 should tend to remain within the tool member 7, the application of the tool to the next tomato to be cored will force it through and from the member and handle.

From the foregoing description taken in connection with the accompanying drawings, the advantages of the present coring tool features will be readily understood by those skilled in the art to which the invention appertains. While I have described the principle of operation, together with the arrangement which I now consider to be the preferred embodiment thereof, I desire to have it understood that the showings are primarily illustrative, and that such changes and developments may be made, when desired, as fall within the scope of the following claims.

I claim:

1. In a coring tool, a coring element comprising a tubular portion having a transverse cutting edge for substantially half its circumference at its forward end and a laterally sharpened cutting blade portion extending for the remainder of the circumference from and beyond the cutting edge longitudinally of the first portion, and a tubular handle element telescopically receiving said coring element in adjustably fixed position therein, the forward end of the handle element being disposed rearwardly of the transverse cutting edge of the coring element and comprising a stop for limiting the distance of insertion of the blade and cutting edge into the article to be cored.

2. A structure in accordance with claim 1 having the coring element axially split and frictionally gripped within the bore of the handle element.

3. A structure in accordance with claim 1 having the transverse cutting edge of the tubular portion serrated.

4. A coring tool comprising a tubular portion having a transverse cutting edge for at least half of its circumference at its forward end and a laterally and terminally sharpened rectangular cutting blade portion extending forwardly from the remainder of the circumference longitudinally of the tubular portion as a longitudinal extension of a side part thereof, the cutting blade having a curvedly inturned outer portion thereof terminating substantially in the axial line of the tubular portion.

WILLIAM A. KINGSBURY.

REFERENCES CITED

The following references are of record in the file of this patent:

UNITED STATES PATENTS

| Number | Name | Date |
|---|---|---|
| 1,206,403 | Benedict | Nov. 28, 1916 |
| 1,213,361 | Hayward | Jan. 23, 1917 |
| 1,270,040 | Miller | June 18, 1918 |
| 1,485,681 | Lake | Mar. 4, 1924 |